G. E. CLEVELAND.
GLASS SEVERING AND PRESSING MECHANISM.
APPLICATION FILED NOV. 24, 1913.
1,171,928.
Patented Feb. 15, 1916.
3 SHEETS—SHEET 2.
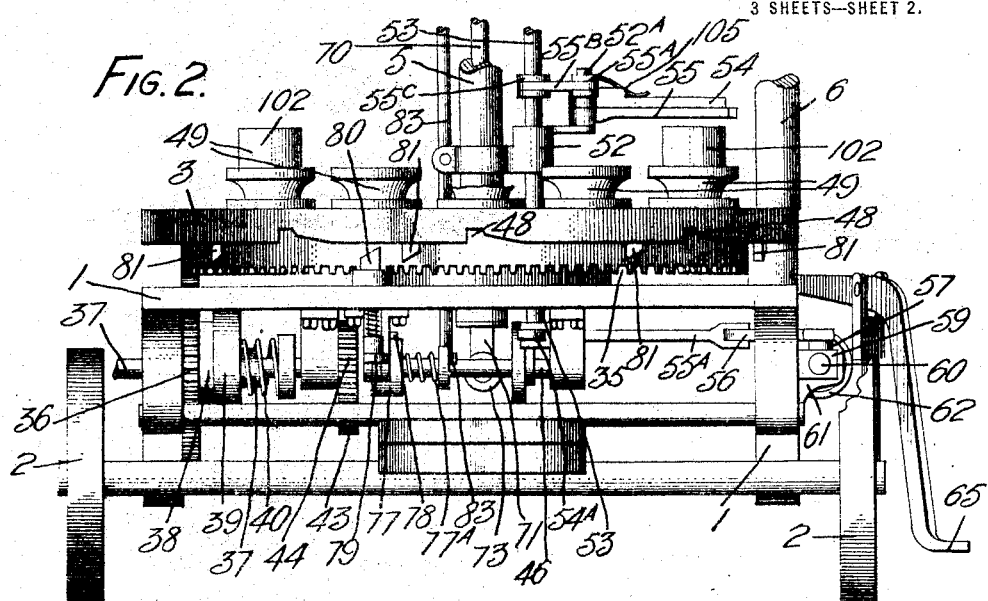
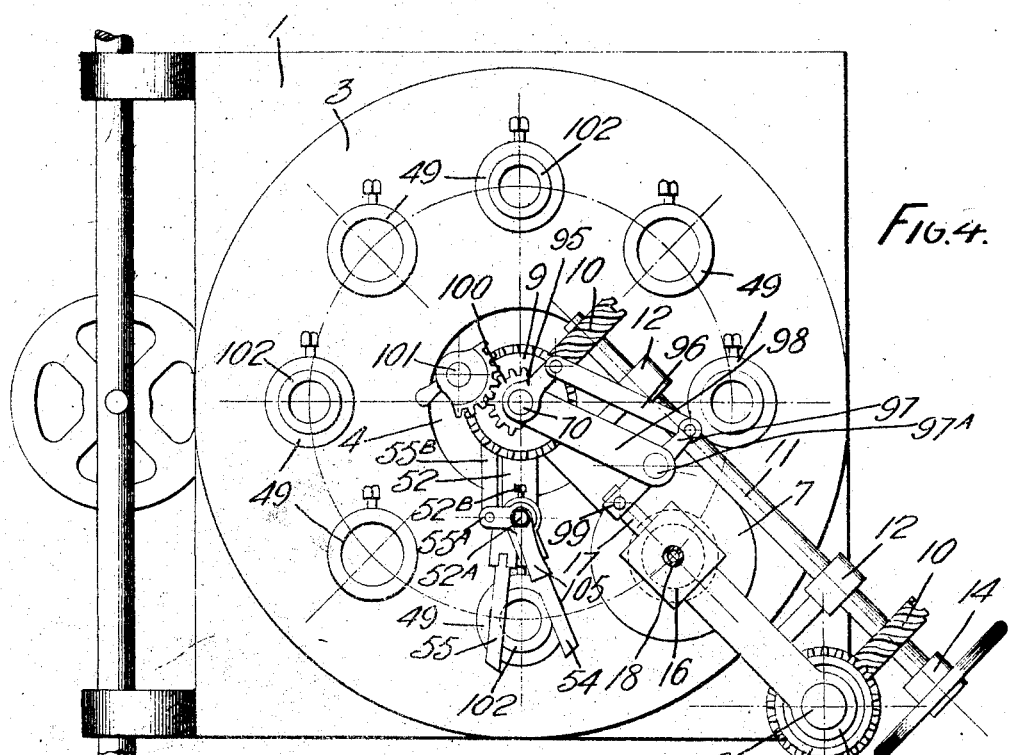
WITNESSES
INVENTOR
George E. Cleveland
BY Vernon M. Dorsey
ATTORNEY

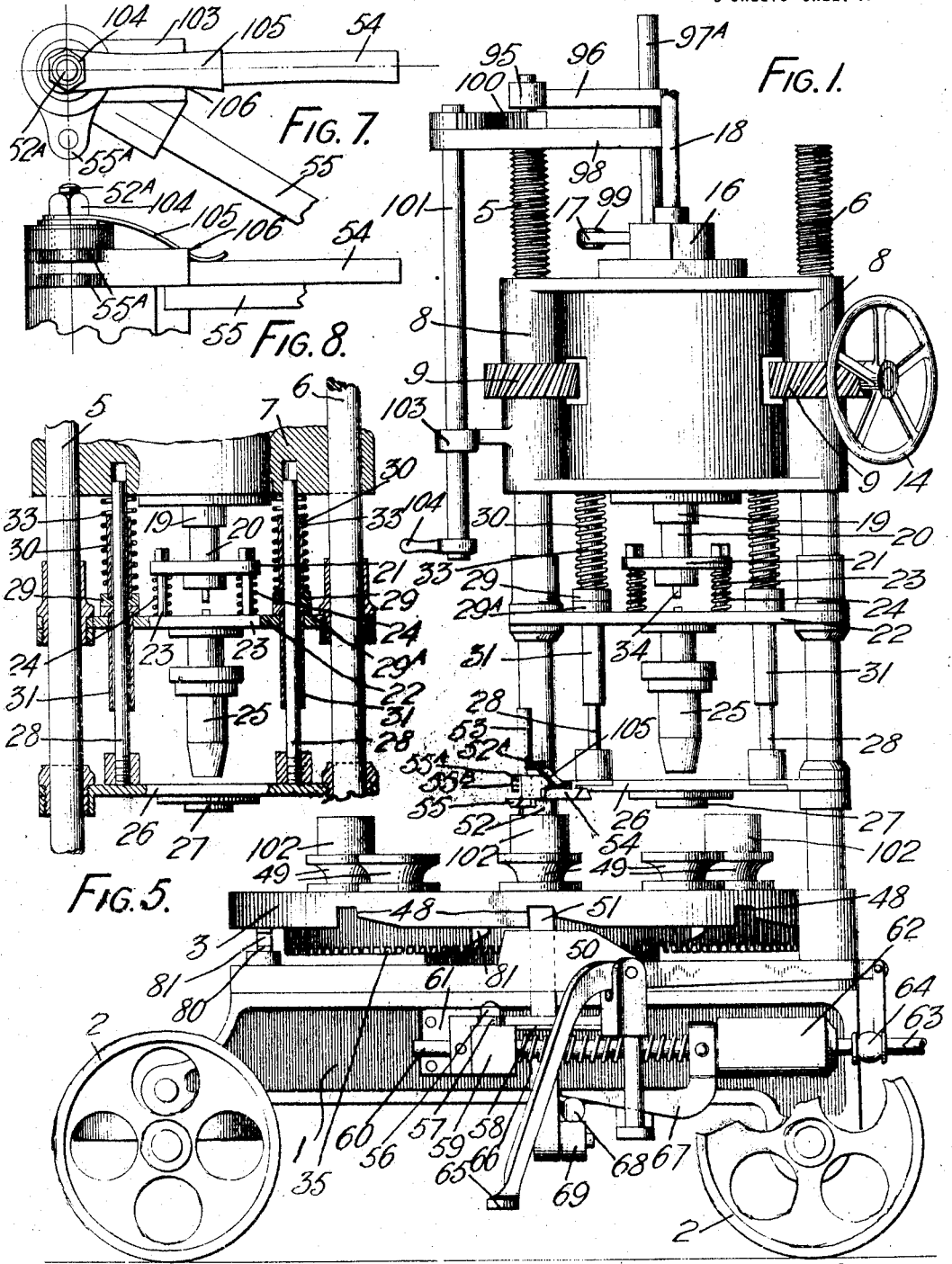
G. E. CLEVELAND.
GLASS SEVERING AND PRESSING MECHANISM.
APPLICATION FILED NOV. 24, 1913.
1,171,928.  Patented Feb. 15, 1916.
3 SHEETS—SHEET 1.

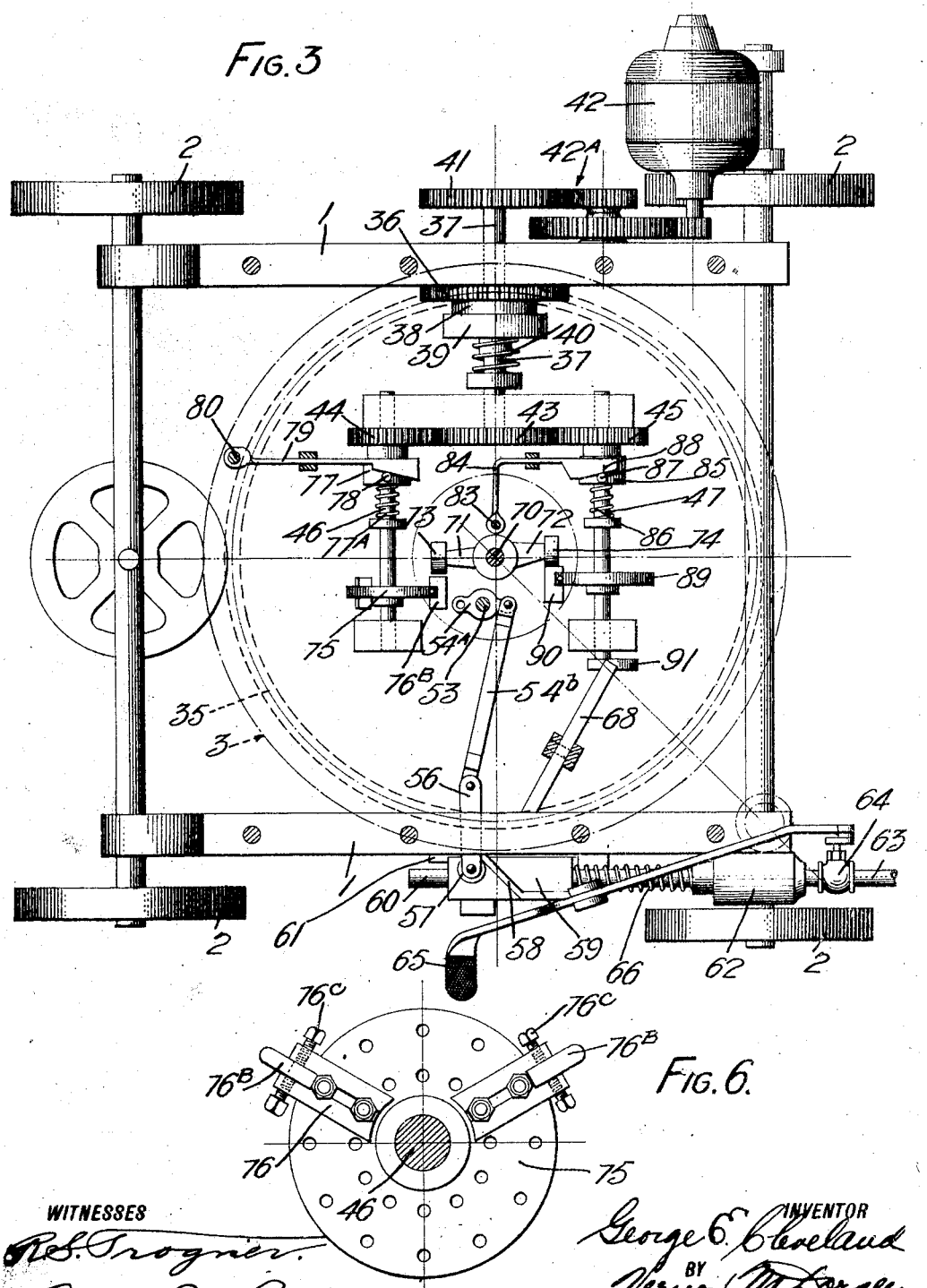

UNITED STATES PATENT OFFICE.

GEORGE E. CLEVELAND, OF FAIRMOUNT, INDIANA, ASSIGNOR TO CLEVELAND MACHINE COMPANY, A CORPORATION OF INDIANA.

GLASS SEVERING AND PRESSING MECHANISM.

1,171,928.   Specification of Letters Patent.   Patented Feb. 15, 1916.

Application filed November 24, 1913. Serial No. 802,740.

*To all whom it may concern:*

Be it known that I, GEORGE E. CLEVELAND, a citizen of the United States of America, and a resident of Fairmount, Indiana, have invented certain new and useful Improvements in Glass Severing and Pressing Mechanisms, of which the following is a specification.

This invention relates to certain improvements in glass presses. In a prior Patent, No. 987,671, granted to me March 21, 1911, I have shown a type of such machine in which a rotating mold-carrying table is frictionally driven beneath suitable glass shearing, pressing and blowing mechanisms, and is temporarily arrested with the molds thereon beneath such mechanisms, by means of a latch mechanism, which is actuated from the table rotating-power and controlled at times by the movement of the pressing plunger, which in turn is controlled by the rotation of the table. In the present case, blowing mechanism as a part of the machine is dispensed with, any blowing of the pressed blank that may be necessary being accomplished after such blank is removed from the machine, and the construction is such that upon the actuation of the glass shears, the latch is withdrawn from the table, which thereupon rotates sufficiently to bring the mold with the severed glass therein beneath a press-plunger, which, by a valve controlled by the said rotation, is caused to descend to effect the pressing. The descent of the plunger through a timing element driven from the table power shaft causes the plunger to rise, and may also through such timing element again actuate the table-latch to permit the table to be again put in rotation for another partial revolution.

The invention also comprises certain new and useful improvements in the construction, arrangement and combination of the several parts of which it is composed as will be hereinafter more fully described and claimed.

Referring to the accompanying drawings, in which corresponding parts are designated by corresponding marks of reference: Figure 1 is a side elevation of a press embodying my invention. Fig. 2 is a fragmental front elevation thereof. Fig. 3 is a horizontal section through the base frame. Fig. 4 is a plan view. Fig. 5 is a fragmental sectional view through the pressing head. Fig. 6 is a detail view of the actuating mechanism for throwing the air-valve to effect a depression of the plunger. Figs. 7 and 8 are a plan and elevation respectively in detail of the shear mechanism.

The various parts are carried by a substantially rectangular base frame 1 having supporting wheels 2, upon which it is mounted for convenience in moving the press to and from the furnace. Upon the upper surface of the base is the mold table 3, which is in the form of an annulus, the central opening of table being received by a circular boss 4 on the top of the base frame, around which boss the table is rotatable. Arising from the center of this boss, and secured thereto, is a vertical hollow standard 5, while a second vertical standard 6 arises from a corner of the base outside of the outer periphery of the table. The upper ends of these standards are threaded and on them is mounted for vertical movement the press head. This comprises a casting 7, in the form of a cylinder having side ears 8, which are vertically bored to receive the standards, each ear 8 being recessed to receive a nut 9 engaging the threads on the corresponding standard, the peripheries of such nuts being circular, and provided with worm teeth with which engage worms 10 carried on a horizontal shaft 11 mounted in brackets 12 projecting from the side of the casting, the shaft having on the end thereof a hand wheel 14 by which the shaft, and the nuts, may be rotated and thus the casting raised and lowered.

Upon the head of the cylinder a suitable valve casing 16 is mounted, containing a reversing valve, the actuating stem of which is shown at 17, and which is adapted to direct fluid pressure (preferably air) from the pressure supply pipe 18 into either the top or bottom of the cylinder and to permit the escape of pressure from the opposite end thereof.

Mounted within the cylinder and projecting through a stuffing box 19 on the lower end thereof is a piston rod 20, the latter having a cross head 21 on the lower end between the cross-heads by spiral springs 24, by which the cross-head 17 will be depressed, on the descent of the piston-rod. A press plunger 25 adapted, as will be hereinafter described, to enter the mold, is carried by and depends downwardly from the cross head 24 between the standards.

Guided on the standards 5 and 6 below the plunger cross head 22, is a lower cross head 26, which is centrally apertured to permit the passage of the plunger 25, therethrough in the pressing, the cross head 26 carrying the head ring 27, and having attached thereto the lower ends of rods 28, which project upwardly therefrom and passing through the cross-head 22, have their upper ends received in holes formed in the bottom of the casting 7, in which holes they are capable of vertical movement. Each of these rods has thereon, above the cross head 22, two nuts 29 and 29ª, the upper of which 29 is counter-bored to receive the lower end of a sleeve 30, which projects upwardly and around the rod, while the lower nut 29ª receives the upper end of a sleeve 31 which extends downwardly through the cross-head 22, in which it may slide, and around the rod. The rods are threaded to permit the adjustment of the nuts thereon, and the sleeves protect the threads against wear. A spiral spring 33 encircles each rod 28 and the upper sleeve 30 thereon, being located between the lower face of the casting 7 and the upper nut 29 on the rod. Such springs thus tend to depress the rods 28, and with them the cross head 26. When, however, the piston-rod is raised, the cross-head 22 lifted thereby, through the nuts 29ª lifts the rods and the cross-head 26 to a point sufficiently elevated to permit the positioning of a mold under the latter by the rotation of the table. When, however, the piston rod is depressed, the rods 28 are released and the springs 33 depress the lower cross head and seat it on the mold. The piston rod is hollow and has at the lower end thereof a tappet valve 34 which is adapted to be actuated to release pressure within the head of the cylinder upon the descent of the piston against undue pressure, thus causing a compression of the springs 24, as is fully described in my patent hereinbefore referred to.

It will be seen that with the structure above described, the springs 33 constantly tend to depress the head ring carrying cross head 24 (being normally restrained therefrom by fluid pressure in the base of the press cylinder), and that such head-ring is not seated and held against the hydrostatic pressure of glass in the mold, caused by the plunger, by the pressure which actuates the plunger. This is important in reducing the pressure which is required to effect the pressing and permits greater accuracy of adjustment in such pressure.

The actuation of the reversing valve and the admission of air to the upper part of the cylinder effects a depression of the piston rod, releasing the head-ring cross-head which seats the head-ring on the mold top, and also acting through the springs 24 depresses the plunger cross-head 22 and drives the plunger into the mold.

The table 3 has crown teeth 35 on the under surface thereof, which teeth are in mesh with a gear 36 sleeved on a horizontal shaft 37 journaled in the base frame, and driven by such shaft through a friction coupling, comprising two friction disks 38 and 39, the former fast to the gear 36 and the latter feathered on the shaft 37 and sliding thereon, being held against the side of the disk, by a spring 40. The outward end of the shaft has keyed thereon a gear wheel 41, driven through suitable reduction gearing 42ᴬ, from a motor 42. The motor 42 runs continuously in the use of the machine, and the necessary pauses of the table are due to the slip occurring in the friction coupling. The inner end of the shaft 37 has keyed thereon a gear 43, meshing with gears 44 and 45, mounted on opposite sides thereof, and sleeved on horizontal shafts 46 and 47, respectively. The under side of the table at the outer periphery thereof is further provided with a series of notches 48, spaced around the table and preferably equal in number to the number of mold-receiving bases 49 thereon, and so disposed relatively thereto that when the alternate notches are in engagement with the latch mechanism hereinafter referred to a mold base will be located in the pressing position below the plunger 25, and another base below the shearing mechanism, hereinafter referred to, respectively.

Guided in a vertical bearing 50 formed in the machine base 1 is a vertically moving latch bolt 51 normally thrown up against the under side of the table and adapted in the rotation of the table through its friction-drive to engage the notches 48 therein, and thus arrest the table.

Mounted on the hollow standard 5 and at such angular position there-around as to be slightly in advance of the radial line on which is situated the press plunger 25 (the position of which determines the pressing position) is a bracket 52, which has on the upper face of the outer end thereof, a stud 52ᴬ and which also serves as the upper bearing of a vertical shaft 53, which projects above the bracket. The shearing mechanism consists of a movable blade 54 and a fixed blade 55. The fixed blade is adjustable around the stud 52ᴬ and may be locked in any desired angular position therearound by a set-screw 52ᴮ its preferred position being not directly over the center of the mold, but to one side of such center and preferably over the rear side of the mold as is illustrated in Fig. 4. The fixed blade has, by preference, both its back and front edges so shaped that either can be used as severing edges. The movable blade is sleeved on the stud 52^A and has a laterally extending crank arm 55^A thereon connected by a link 55^B, to a crank 55^C feathered on the shaft 53, above the bracket. The lower end of the shaft 53 has keyed thereon a cross head 54^A, either end of which may be connected by a link 54^B with a slide 56 mounted for horizontal in and out movement in the side of the base frame. By changing the connection of the link between the opposite ends of the cross head 54^A, and by making a corresponding angular adjustment of the fixed knife on the upper end of the shaft 53, the knife 54 may be made to cut toward the front or rear edge of the fixed blade 55, as may be demanded by the article being pressed.

The outer end of the slide 56 has mounted thereon a roller 57 which coöperates with a cam-way 58 formed on a block 59 carried on the outer end of a piston-rod 60, such outer end of the piston rod passing through, and being guided in a bracket 61 on the machine base 1, such bracket also serving as a guide for the block 59. The piston rod is actuated in one direction by suitable fluid-pressure within a cylinder 62, supplied through a branch 63 of the pipe 18 and through a suitable valve mechanism 64, the valve mechanism being controlled to admit fluid pressure to drive the piston-rod outwardly by means of a pedal 65. The piston-rod is restored to its normal retracted position when such pressure is cut off and relieved, by means of a spring 66. The actuation of the rod 56 through the mechanism before described results in the movement of the movable blade toward the fixed blade, and thus in the shearing of a stream of glass, that may be flowing off a puntee or from any other suitable source of flowing glass, into a mold located adjacent to the shears.

The piston rod 60 has fixed to it and located therebelow a cam 67, which is situated over the outer end of a lever 68 pivoted in the base frame, the end of the lever being in turn over an anti-friction roller 69 carried on the lower end of the latch bolt 51, so that upon the outward movement of the piston rod to shear the glass, the outer end of the lever 68 will be depressed, depressing the latch bolt, and disengaging it from the notch of the table in which it was located, permitting the rotation of the table by means of its friction drive, until another notch in the table comes above the latch bolt, which, the pedal 65 at this time having been released by the operator, will be again projected upwardly. By the rotation of the table thus allowed the mold which was located beneath the severing point will be carried therefrom to the pressing point.

Located within the hollow standard 5 is the vertical shaft 70, which at its upper end is connected to, and actuates the reversing valve stem 17, such shaft carrying upon its lower end, and inside of the frame 1, opposite arms 71 and 72, the arm 71 having a roller 73 thereon, and the arm 72 a roller 74. Keyed to the inner end of the shaft 46 is the disk 75, carrying a wiping arm 76 angularly adjusted thereon, and adapted in the rotation of the disk to engage the roller 73 of the arm 71, and impart angular movement to the vertical shaft 70, whereby the reversing valve will be actuated to admit pressure to the head of the press cylinder, and thus depress the plunger. The rotation of the horizontal shaft 46 to effect this is effected by a clutch, comprising two members, one of which is the constantly driven gear 44, and the other of which, 77, is thrown by a spring 77^a into engagement with the gear 44. Projecting from the hub of the clutch member 77 is a pin 78, coöperating with the rear end of a lever 79 pivoted intermediate of its length in the base frame, the forward end of such lever carrying an upwardly projecting stud 80 which terminates at its upper end in a beveled face immediately below the mold table, which at points therearound is provided with downwardly extending lugs 81 having beveled faces adapted to ride upon and successively depress the stud 80 on the rotation of the table. These lugs are so arranged that as the table approaches the position in which it will be locked by the latch-bolt with the mold thereon in the pressing position, they will depress the front end of the lever 79 and thus lift the rear end thereof away from the pin 78 on the clutch-member 77, permitting the spring 77^a to throw the clutch members into engagement whereby the shaft 46 will be put in rotation. As soon as a lug 81 moves from over the stud 80, which it does before the mold is in pressing position, the rear end of the lever 79 will again drop upon the hub of the clutch-member 77, and as the shaft 46 completes its rotation, the pin 78 thereon will, by striking the rear end of the lever, which is beveled for this purpose, be moved laterally, carrying with it the clutch-member 77 and thus disengaging the clutch and arresting the rotation of the shaft 46 after it shall have made a complete revolution. During this rotation of the shaft the wiper or wipers 76 thereon (which may be of any desired shape and number to give variation in the time of opening of the reversing valve and the extent of such opening) will, by striking the cam 73 upon the arm 71 of the reversing-valve shaft 70, throw such reversing-valve to permit air to enter the upper end of the pressing cylinder, and thus depress the piston rod thereof and depress the plunger actuated thereby, thus effecting the molding of the glass in the mold, the mold being at this time stationary in the pressing position.

Attached to and depending from the upper cross head 22 is the tripper rod 83 passing through the central opening in the table, and situated above one end of a lever 84, pivoted in the frame base 1, the opposite end of such lever extending over and in proximity to one member 85 of a clutch feathered on the shaft 47, the opposite member of which clutch forms the hub of the gear wheel 45, the clutch members being thrown into engagement by a spiral spring 86, and being adapted to be thrown out of engagement by the pin 87 on the member 85 running up an incline face 88 on the lever 84, when the latter rests upon the member 85. Upon the descent of the piston rod in effecting a pressing of glass, the tripper 83 lifts the beveled end 88 of the lever 84 away from the pin 87, and the clutch formed by the parts 85 and 45 is thrown into engagement, whereby the shaft 47 will be put in rotation from the constantly driven gear 45. The shaft 47 carries thereon a disk 89 provided with a wiper arm 90 adapted in the rotation of the disk to engage and actuate the roller 74 on the end of the arm 72 of the air-valve shaft 70, so that upon the shaft 47 being put into rotation, as before stated, it will, after an angular movement dependent upon the position of the wiper 80 in respect to the pin 77 throw the valve rod shaft to reverse the air valve and admit air at the lower end of the cylinder, whereby the piston-rod 20 will be raised and the plunger withdrawn from the mold. The extent to which it is necessary to rotate the shaft 47 from its normal position before the air valve is reversed determines the dwell of the press plunger in the mold. The shaft 47 further carries upon its inner end a cam disk 91 adapted, when the shaft shall have in its rotation caused the upward movement of the press plunger through the air mechanism before described, to lift the inner end of the lever 68, and to thus, by depressing the outer end of such lever disengage the latch 51 from the notches 48 in the table, thus releasing the latter for friction drive through another part of its revolution, after which the cam disk will again permit the latch to engage the table, holding it against rotation. At this time the table will have fed sufficiently far to have removed the mold with the pressed article thereon from underneath the pressing point, and to have positioned a mold base below the shears in the manner before described, whereupon a fresh batch of glass may be severed by the shears, dropping in the mold located beneath them and the mold with the first article therein removed from the base and given further treatment, as by blowing, if any such treatment be required. When the shaft 47 completes its rotation, the pin 87 thereon, by running up the incline 88 on the lever 84, again disengages the clutch-members 85 and 45 and the rotation of the shaft 47 is thus arrested.

Each wiper arm has projecting therefrom transversely thereto a wiper finger 76$^B$ adjustable by the set screws 76$^C$ and is secured on the disk adjustably in different angular positions. By the angular adjustment of the first wiper arm 76, and the transverse adjustment of the wiper ear 76$^B$, thereon, the time of the first admission of pressure to the top of the cylinder and the rate thereof, respectively, may be adjusted to move the plunger downwardly without hammering, while by the adjustments of the second wiper arm and the wiper finger thereon, the period thereafter that an additional throw is given to valve and the extent of such throw may be varied, the latter serving to increase the pressure during the "setting" of the glass, as is desirable.

The vertical valve shaft is connected to the stem of the reversing valve by an arm 95 fast on the shaft and connected by a link 96 with one end of a crank 97 feathered to slide on a vertical rock shaft 97$^A$, which has its lower end mounted in the cylinder casting, and which is journaled in a bracket arm 98 carried by the standard near the upper end thereof. A second crank 99 is keyed to the rock shaft, and is connected to the valve slide 17. By this construction, the cylinder casting may be raised or lowered without disturbing the connection between the valve shaft and the valve stem. A toothed sector 100 is fast on the upper end of the valve shaft, and meshes with a similar sector fast on the upper end of a rock shaft 101 carried in the bracket arm 98 and in a bracket 103 on the cylinder casting, the lower end of such shaft being provided with a crank 104 by which the shaft 101 may be given angular motion, thereby actuating the reversing valve by hand, as is desirable when adjusting the machine.

Suitable molds 102 are removably contained in the mold bases. In the machine as before described, the filled mold is moved from the charging to the pressing position, and is automatically removed from that the last named position by the completion of the pressing operation. This is desirable when the number of molds on the table is only half of the number of the arresting notches, as in this case the feed of the table produced by the severing and the pressing mechanisms conjointly equals the spacing of the molds. This however is not essential, as the mold with the pressed charge thereon may remain in the pressing position until the table is again put in rotation by the severing mechanism. This is particularly possible when the angular distance between the successive molds is the same as the angular distance between the locking notches, as in such a case a mold will be brought into the severing position as the mold in advance thereof is brought into the pressing position. To accomplish this operation, it only is necessary to provide the proper number of molds and remove the cam disk 91.

In Figs. 7 and 8, I have shown in detail certain improvements in the construction of the shears. As there shown the movable blade 54 is mounted in a shear holder 103, which is sleeved on the stud 52ª, which carries on its upper end a nut 104. Surrounding the stud between the holder 103 and the nut thereon is a bow spring 105, one end of which bears on the hub of the holder and the other on the blade 54 at a point which is approximately above the shearing point. Intermediate of its length the spring lies within a notch 106 locked in the upper face of the holder and on the end of the arm thereof, whereby the end of the spring is maintained in proper relation to the blade. It will be seen that by raising or lowering the nut on the stud, the pressure exerted by the spring on the blade may be varied, and that the spring, bearing at its opposite ends, both on the holder adjacent to the pivotal point, and on the blade at approximately the severing point, takes up any wear in the blades and insures a clean cut.

I do not in the present application make claim to the construction of the shears, or the mounting thereof, or their relation to the molds or to the co-relation between the movement of the shears and the mold, as the same forms the subject-matter of my other application serially numbered 24598, filed Apr. 28, 1915.

Having thus described my invention, what I claim and desire to secure by Letters Patent is:—

1. In a glass pressing device, the combination with a rotary table adapted to receive a press mold, of a press plunger movable to and from the table, a fluid pressure cylinder actuating the said plunger, a friction-drive mechanism constantly tending to rotate the said table, a latch for the table, means for initially releasing the said latch, means actuated by the initial movement of the table for admitting fluid pressure to the pressure cylinder to depress the plunger, timing means actuated by the descent of the plunger for admitting fluid pressure to the said cylinder to raise the plunger and to subsequently again release the table latch.

2. In a glass pressing device, the combination with a rotary table, and a press mold thereon, of a press plunger coöperating with said mold, constantly rotating means for the table, a fluid pressure actuator for the plunger, a valve for controlling the application of power thereto, an actuator for said valve comprising a disk carrying thereon two wipers, one radially and the other angularly adjustable thereon, and means controlled by the rotation of the table to drive said disk from the constantly rotating means for the table.

3. In a glass pressing device, the combination with a rotary mold-carrying table, of a press plunger movable to and from the table, a fluid pressure cylinder actuating the said plunger, a reversing valve controlling the application of pressure to the plunger, a rocking valve shaft, wipers adapted to reversely rock the said shaft, a gear driving the said table, a latch for the table, a source of power, a friction coupling interposed between the source of power and the table drive gear, and clutches interposed between the source of power and the wipers, means controlled respectively by the movement of the table and of the plunger for closing the clutches, and means connected with the wiper actuated by the descent of the plunger for releasing the table latch.

In testimony whereof I hereunto affix my signature in the presence of two witnesses.

GEORGE E. CLEVELAND.

In the presence of—
F. F. PFEIFFER,
ED. PFEIFFER.